(12) United States Patent
Bijwe

(10) Patent No.: US 9,609,676 B1
(45) Date of Patent: Mar. 28, 2017

(54) EFFICIENT TRANSITION FROM DISCOVERY TO LINK ESTABLISHMENT

(71) Applicant: MARVELL INTERNATIONAL LTD., Hamilton (BM)

(72) Inventor: Sagar D. Bijwe, Pune (IN)

(73) Assignee: Marvell International Ltd., Hamilton (BM)

( * ) Notice: Subject to any disclaimer, the term of this patent is extended or adjusted under 35 U.S.C. 154(b) by 900 days.

(21) Appl. No.: 13/851,543

(22) Filed: Mar. 27, 2013

Related U.S. Application Data

(60) Provisional application No. 61/617,876, filed on Mar. 30, 2012.

(51) Int. Cl.
*H04W 76/02* (2009.01)

(52) U.S. Cl.
CPC .................. *H04W 76/022* (2013.01)

(58) Field of Classification Search
CPC ....... H04W 8/26; H04W 88/06; H04W 48/16; H04W 48/08; H04W 4/008; H04W 4/08; H04W 76/043; H04W 88/04; H04W 76/023; H04W 8/22; H04W 28/18; H04W 76/02; H04L 41/0816; H04L 41/12; H04L 43/0829
See application file for complete search history.

(56) References Cited

U.S. PATENT DOCUMENTS

| | | |
|---|---|---|
| 4,337,463 A | 6/1982 | Vangen |
| 5,673,291 A | 9/1997 | Dent |

(Continued)

FOREIGN PATENT DOCUMENTS

| | | |
|---|---|---|
| EP | 1860827 A2 | 11/2007 |
| JP | 2006174162 A | 6/2006 |

(Continued)

OTHER PUBLICATIONS

IEEE Std 802.11™ 2012 (Revision of IEEE Std 802.11-2007) IEEE Standard for Information technology—Telecommunications and information exchange between systems—Local and metropolitan area networks—Specific requirements Part 11: Wireless LAN Medium Access Control (MAC) and Physical Layer (PHY) specifications, The Institute of Electrical and Electronics Engineers, Inc., pp. 1-2695 (Mar. 29, 2012).

(Continued)

*Primary Examiner* — Yee Lam

(57) ABSTRACT

A method includes receiving, via a first communication interface of a first station, a probe request signal transmitted by a second station, and determining, at the first station, a connectivity type to be used in establishing a wireless communication link between the first and second stations. The determined connectivity type is associated with a different, second communication interface of the first station. The method also includes generating, at the first station, a probe response signal, at least in part by generating a first field within the probe response signal. The first field specifies an address of the second communication interface. The method also includes transmitting, via the first communication interface, the probe response signal to the second station. The address of the second communication interface specified in the first field is useable by the second station to establish the wireless communication link between the first and second stations.

24 Claims, 10 Drawing Sheets

(56) References Cited

U.S. PATENT DOCUMENTS

| | | | |
|---|---|---|---|
| 6,035,210 A | 3/2000 | Endo et al. | |
| 6,320,919 B1 | 11/2001 | Khayrallah et al. | |
| 6,760,671 B1 | 7/2004 | Batcher et al. | |
| 6,816,452 B1 | 11/2004 | Maehata | |
| 7,239,882 B1 | 7/2007 | Cook | |
| 7,342,895 B2 | 3/2008 | Serpa et al. | |
| 7,551,948 B2 | 6/2009 | Meier et al. | |
| 7,564,826 B2 | 7/2009 | Sherman et al. | |
| 7,580,397 B2 | 8/2009 | Arai et al. | |
| 7,595,768 B2 | 9/2009 | Li et al. | |
| 7,599,671 B2 | 10/2009 | Kopikare et al. | |
| 7,626,966 B1 | 12/2009 | Ruiter et al. | |
| 7,711,004 B2 | 5/2010 | Xu | |
| 7,881,755 B1 | 2/2011 | Mishra et al. | |
| 7,957,340 B2 | 6/2011 | Choi et al. | |
| 7,966,036 B2 | 6/2011 | Kojima | |
| 8,014,329 B2 | 9/2011 | Gong | |
| 8,072,913 B2 | 12/2011 | Desai | |
| 8,078,111 B2 | 12/2011 | Jovicic et al. | |
| 8,140,075 B2 | 3/2012 | Watanabe | |
| 8,149,715 B1 | 4/2012 | Goel et al. | |
| 8,170,002 B2 | 5/2012 | Wentink | |
| 8,170,546 B2 | 5/2012 | Bennett | |
| 8,189,506 B2 | 5/2012 | Kneckt et al. | |
| 8,203,985 B2 | 6/2012 | Gong et al. | |
| 8,229,087 B2 | 7/2012 | Sumioka et al. | |
| 8,254,296 B1 | 8/2012 | Lambert et al. | |
| 8,274,894 B2 | 9/2012 | Kneckt et al. | |
| 8,310,967 B1 | 11/2012 | Goel et al. | |
| 8,340,034 B1 | 12/2012 | Lee et al. | |
| 8,472,427 B1 | 6/2013 | Wheeler et al. | |
| 8,553,561 B1 | 10/2013 | Chokshi et al. | |
| 8,737,370 B2 | 5/2014 | Wentink | |
| 8,750,278 B1 | 6/2014 | Wagholikar et al. | |
| 8,767,771 B1 | 7/2014 | Shukla et al. | |
| 8,817,662 B2 | 8/2014 | Mahaffy et al. | |
| 8,817,682 B1 | 8/2014 | Goel et al. | |
| 8,861,469 B1 | 10/2014 | Lee et al. | |
| 8,891,497 B1 | 11/2014 | Vleugels | |
| 9,036,517 B2 | 5/2015 | Bijwe | |
| 2002/0025810 A1 | 2/2002 | Takayama et al. | |
| 2002/0049854 A1 | 4/2002 | Cox et al. | |
| 2002/0102941 A1 | 8/2002 | Kuiri et al. | |
| 2003/0040316 A1 | 2/2003 | Stanforth et al. | |
| 2003/0214430 A1 | 11/2003 | Husted et al. | |
| 2004/0013128 A1 | 1/2004 | Moreton et al. | |
| 2004/0105401 A1 | 6/2004 | Lee | |
| 2004/0192222 A1 | 9/2004 | Vaisanen et al. | |
| 2004/0233881 A1 | 11/2004 | Kang et al. | |
| 2004/0264396 A1 | 12/2004 | Ginzburg et al. | |
| 2004/0264397 A1 | 12/2004 | Benveniste | |
| 2005/0018641 A1 | 1/2005 | Zhao et al. | |
| 2005/0025104 A1 | 2/2005 | Fischer et al. | |
| 2005/0025174 A1 | 2/2005 | Fischer et al. | |
| 2005/0135360 A1 | 6/2005 | Shin et al. | |
| 2005/0174962 A1 | 8/2005 | Gurevich | |
| 2005/0186962 A1 | 8/2005 | Yoneyama et al. | |
| 2005/0195786 A1 | 9/2005 | Shpak | |
| 2005/0206554 A1 | 9/2005 | Yamaura | |
| 2005/0250528 A1 | 11/2005 | Song et al. | |
| 2005/0254423 A1 | 11/2005 | Berghoff | |
| 2005/0281278 A1 | 12/2005 | Black et al. | |
| 2006/0007863 A1 | 1/2006 | Naghian | |
| 2006/0079232 A1 | 4/2006 | Omori et al. | |
| 2006/0120338 A1 | 6/2006 | Hwang et al. | |
| 2006/0199565 A1 | 9/2006 | Ammirata | |
| 2006/0200862 A1 | 9/2006 | Olson et al. | |
| 2006/0215601 A1 | 9/2006 | Vleugels et al. | |
| 2006/0251198 A1 | 11/2006 | Ma et al. | |
| 2006/0252418 A1 | 11/2006 | Quinn et al. | |
| 2006/0264179 A1 | 11/2006 | Bonneville et al. | |
| 2006/0268756 A1 | 11/2006 | Wang et al. | |
| 2006/0268804 A1 | 11/2006 | Kim et al. | |
| 2006/0282541 A1 | 12/2006 | Hiroki | |
| 2006/0282667 A1 | 12/2006 | Kim et al. | |
| 2006/0286935 A1 | 12/2006 | Utsunomiya et al. | |
| 2007/0010237 A1 | 1/2007 | Jones et al. | |
| 2007/0010247 A1 | 1/2007 | Mouna-Kingue et al. | |
| 2007/0014314 A1 | 1/2007 | O'Neil | |
| 2007/0026810 A1 | 2/2007 | Love et al. | |
| 2007/0032211 A1 | 2/2007 | Kopikare et al. | |
| 2007/0060057 A1 | 3/2007 | Matsuo et al. | |
| 2007/0109973 A1 | 5/2007 | Trachewsky | |
| 2007/0178888 A1 | 8/2007 | Alfano et al. | |
| 2007/0183443 A1 | 8/2007 | Won | |
| 2007/0206519 A1 | 9/2007 | Hansen et al. | |
| 2007/0206762 A1 | 9/2007 | Chandra et al. | |
| 2007/0223430 A1 | 9/2007 | Desai et al. | |
| 2007/0238482 A1 | 10/2007 | Rayzman et al. | |
| 2007/0242645 A1 | 10/2007 | Stephenson et al. | |
| 2007/0268862 A1 | 11/2007 | Singh et al. | |
| 2007/0286298 A1 | 12/2007 | Choi et al. | |
| 2007/0297388 A1 | 12/2007 | Appaji et al. | |
| 2008/0056201 A1 | 3/2008 | Bennett | |
| 2008/0069034 A1 | 3/2008 | Buddhikot et al. | |
| 2008/0080446 A1 | 4/2008 | Chung | |
| 2008/0095058 A1 | 4/2008 | Dalmases et al. | |
| 2008/0095059 A1 | 4/2008 | Chu | |
| 2008/0100494 A1 | 5/2008 | Yamaura | |
| 2008/0130595 A1 | 6/2008 | Abdel-Kader | |
| 2008/0137580 A1 | 6/2008 | Axelsson et al. | |
| 2008/0139212 A1 | 6/2008 | Chen et al. | |
| 2008/0161031 A1 | 7/2008 | Tu | |
| 2008/0170550 A1 | 7/2008 | Liu et al. | |
| 2008/0181154 A1 | 7/2008 | Sherman | |
| 2008/0187003 A1 | 8/2008 | Becker | |
| 2008/0232287 A1 | 9/2008 | Shao et al. | |
| 2008/0240092 A1 * | 10/2008 | Moratt | H04L 41/0816 370/389 |
| 2008/0259846 A1 | 10/2008 | Gonikberg et al. | |
| 2008/0261640 A1 | 10/2008 | Yoshida | |
| 2008/0262991 A1 | 10/2008 | Kapoor et al. | |
| 2008/0279163 A1 | 11/2008 | Desai | |
| 2008/0320108 A1 | 12/2008 | Murty et al. | |
| 2009/0010210 A1 | 1/2009 | Hiertz et al. | |
| 2009/0137206 A1 | 5/2009 | Sherman et al. | |
| 2009/0175250 A1 | 7/2009 | Mathur et al. | |
| 2009/0196210 A1 | 8/2009 | Desai | |
| 2009/0239471 A1 | 9/2009 | Tran et al. | |
| 2009/0245133 A1 | 10/2009 | Gupta et al. | |
| 2009/0245279 A1 | 10/2009 | Wan et al. | |
| 2009/0247217 A1 | 10/2009 | Hsu et al. | |
| 2009/0258603 A1 | 10/2009 | Ghaboosi et al. | |
| 2009/0268652 A1 | 10/2009 | Kneckt et al. | |
| 2009/0279464 A1 * | 11/2009 | Kakani | H04W 76/023 370/311 |
| 2009/0285264 A1 | 11/2009 | Aldana et al. | |
| 2010/0011231 A1 | 1/2010 | Banerjea et al. | |
| 2010/0029325 A1 | 2/2010 | Wang et al. | |
| 2010/0061244 A1 | 3/2010 | Meier et al. | |
| 2010/0069112 A1 | 3/2010 | Sun et al. | |
| 2010/0124213 A1 | 5/2010 | Ise et al. | |
| 2010/0130129 A1 | 5/2010 | Chang et al. | |
| 2010/0138549 A1 | 6/2010 | Goel et al. | |
| 2010/0165896 A1 | 7/2010 | Gong et al. | |
| 2010/0238793 A1 | 9/2010 | Alfano et al. | |
| 2010/0293293 A1 | 11/2010 | Beser | |
| 2010/0311342 A1 | 12/2010 | Arbel | |
| 2010/0316027 A1 | 12/2010 | Rick et al. | |
| 2010/0322213 A1 | 12/2010 | Liu et al. | |
| 2011/0002226 A1 | 1/2011 | Bhatti | |
| 2011/0007675 A1 | 1/2011 | Chiou et al. | |
| 2011/0009074 A1 | 1/2011 | Hsu et al. | |
| 2011/0034127 A1 | 2/2011 | Wentink et al. | |
| 2011/0038291 A1 * | 2/2011 | Seok | H04W 52/0235 370/311 |
| 2011/0069689 A1 | 3/2011 | Grandhi et al. | |
| 2011/0082940 A1 * | 4/2011 | Montemurro | H04W 76/023 709/227 |
| 2011/0097998 A1 | 4/2011 | Ko et al. | |
| 2011/0103264 A1 * | 5/2011 | Wentink | H04W 8/005 370/255 |
| 2011/0103363 A1 | 5/2011 | Bennett | |
| 2011/0142014 A1 | 6/2011 | Banerjee et al. | |

(56) References Cited

U.S. PATENT DOCUMENTS

| | | |
|---|---|---|
| 2011/0161697 A1 | 6/2011 | Qi et al. |
| 2011/0194519 A1 | 8/2011 | Habetha |
| 2012/0039176 A1 | 2/2012 | Eshan et al. |
| 2012/0099476 A1 | 4/2012 | Mahaffy et al. |
| 2012/0106452 A1* | 5/2012 | Kneckt ............... H04W 48/08 370/328 |
| 2012/0155350 A1* | 6/2012 | Wentink ............... H04W 8/005 370/311 |
| 2012/0250576 A1 | 10/2012 | Rajamani et al. |
| 2012/0265913 A1* | 10/2012 | Suumaki ............... H04W 4/008 710/303 |
| 2012/0276938 A1 | 11/2012 | Wagholikar et al. |
| 2012/0327779 A1 | 12/2012 | Gell et al. |
| 2013/0107895 A1* | 5/2013 | Wentink ................ H04L 69/04 370/477 |
| 2013/0114548 A1 | 5/2013 | Banerjea |
| 2013/0227152 A1 | 8/2013 | Lee et al. |
| 2013/0281020 A1* | 10/2013 | Montemurro ....... H04W 76/026 455/41.2 |
| 2014/0146745 A1* | 5/2014 | Huang .................. H04L 63/20 370/328 |
| 2014/0362735 A1 | 12/2014 | Mahaffy et al. |

FOREIGN PATENT DOCUMENTS

| | | |
|---|---|---|
| WO | WO-2006/043956 A1 | 4/2006 |
| WO | WO-2006/090254 A1 | 8/2006 |
| WO | WO-2007/008981 A1 | 1/2007 |
| WO | WO-2007/064822 A2 | 6/2007 |
| WO | WO-2008/070777 A2 | 6/2008 |
| WO | WO-2009/101567 A1 | 8/2009 |
| WO | WO-2011/056878 A1 | 5/2011 |
| WO | WO-2013/104989 A2 | 7/2013 |
| WO | WO-2013/119810 A1 | 8/2013 |

OTHER PUBLICATIONS

Chen, "Home Network Basis: Transmission Environments and Wired/Wireless Protocols," Prentice Hall, pp. 1-26 (Jul. 2003).

Hiertz et al., "The IEEE 802.11 Universe," IEEE Communications Magazine, pp. 62-70, (Jan. 2010).

"Wi-Fi Display Technical Specification Version 1.0.0", Wi-Fi Alliance® Technical Committee, Wi-Fi Display Technical Task Group, 149 pages. (Aug. 24, 2012).

"Wi-Fi Peer-to-Peer (P2P) Technical Specification, Version 1.00", Wi-Fi Alliance, pp. 1-135, Dec. 1, 2009.

"Wi-Fi Peer-to-Peer (P2P) Technical Specification", Wi-Fi Alliance Technical Committee P2P Task Group; Draft Version 1.14, Jun. 25, 2010, 154 pages.

Deering, "Version 6 (IPv6) Specification", RFC2460, Dec. 1998, 37 pages.

\* cited by examiner

EFFICIENT TRANSITION FROM DISCOVERY TO LINK ESTABLISHMENT

CROSS-REFERENCES TO RELATED APPLICATIONS

This claims the benefit of U.S. Provisional Patent Application No. 61/617,876, entitled "Method of Seamless Transition from WFD Device Discovery of One Type (P2P/TDLS) to WFD Connection Establishment of Other" and filed on Mar. 30, 2012, the disclosure of which is hereby incorporated by reference herein in its entirety.

FIELD OF THE DISCLOSURE

The present disclosure relates generally to communication networks and, more particularly, to discovery and link establishment operations in wireless communication networks.

BACKGROUND

Work has begun on a Wi-Fi Display (WFD) specification providing connectivity schemes by which a WFD source device (e.g., a smartphone, laptop or other mobile device) can discover and communicate with a WFD sink device (e.g., digital televisions, monitors, set-top boxes, etc.) on which the WFD source device may wish to play audio and/or video content. In particular, WFD devices can communicate with each other using a direct, "peer-to-peer" (P2P) connection, or via an intermediary such as an access point (when in an IEEE 802.11 infrastructure mode) or P2P group owner. Communications via an access point or P2P group owner may use Tunneled Direct Link Setup (TDLS) connectivity, as defined in the IEEE 802.11z standard.

In addition to allowing P2P and TDLS connectivity for data communications, the current WFD specification allows a WFD device to discover other WFD devices in the vicinity using either a P2P discovery mechanism, in which probe request frames and probe response frames are exchanged directly between WFD devices, or a tunneled discovery mechanism, in which tunneled probe request frames and tunneled probe response frames are exchanged via an access point. The current WFD specification requires that devices support P2P discovery, with additional support for tunneled discovery being optional. The WFD specification also specifies the manner in which WFD devices should resolve the type of connectivity (P2P or TDLS) to be used for link establishment, with the connectivity type depending on the respective connectivity types preferred by the discovering device and the discovered device. Problems may arise, however, when discovery is conducted according to one type (TDLS or P2P), but the communication link is to be established according to the other type (P2P or TDLS). In particular, because a WFD device may use different interfaces (with different addresses) for P2P communications and TDLS communications, the current specification does not provide a reliable mechanism for utilizing discovery of one type and then establishing a link of the other type. Without such a mechanism, it may be impossible to maintain tunneled discovery as an optional feature in WFD devices.

SUMMARY

In an embodiment, a method includes receiving, via a first communication interface of a first station, a probe request signal transmitted by a second station, and determining, at the first station, a connectivity type to be used in establishing a wireless communication link between the first station and the second station. The determined connectivity type is associated with a second communication interface of the first station that is different than the first communication interface of the first station. The method also includes generating, at the first station, a probe response signal. Generating the probe response signal includes generating a first field within the probe response signal. The first field specifies an address of the second communication interface of the first station. The method also includes transmitting, via the first communication interface of the first station, the probe response signal to the second station. The address of the second communication interface specified in the first field of the probe response signal is useable by the second station to establish the wireless communication link between the first station and the second station.

In another embodiment, a communication device includes a first communication interface, a second communication interface, a link establishment module configured to determine a connectivity type to be used in establishing a wireless communication link between the communication device and a station, and a discovery module. The discovery module is configured to receive a probe request signal from the station via the first communication interface. The discovery module is also configured to, when the determined connectivity type is associated with the second communication interface, generate a probe response signal that includes a first field specifying an address of the second communication interface, and to cause the probe response signal to be transmitted to the station via the first communication interface. The address of the second communication interface specified in the first field of the probe response signal is useable by the second station to establish the wireless communication link between the communication device and the station.

In another embodiment, a method includes transmitting, at a first station, a probe request signal, and receiving, at the first station and from a first communication interface of a second station, a probe response signal in response to the probe request signal. The probe response signal includes a first field specifying an address of a second communication interface of the second station, and the second communication interface is different than the first communication interface. The method also includes determining, at the first station, a connectivity type to be used in establishing a wireless communication link between the first station and the second station. The determined connectivity type is associated with the second communication interface. The method also includes participating, at the first station, in establishment of the wireless communication link between the first station and the second station using (i) the determined connectivity type and (ii) the specified address of the second communication interface.

In another embodiment, a communication device includes a discovery module configured to cause a probe request signal to be transmitted, and to receive, in response to the probe request signal, a probe response signal from a first communication interface of a station. The communication device also includes a link establishment module configured to determine a connectivity type to be used in establishing a wireless communication link between the communication device and the station, and, when the determined connectivity type is associated with a second communication interface of the station different than the first communication interface of the station, participate in establishment of the wireless communication link between the communication device and the station (i) according to the determined connectivity type and (ii) using an address of the second communication interface of the station. The address of the second communication interface of the station is specified in a field of the probe response signal.

Embodiments may provide one or more advantages. For example, communication devices (e.g., stations in a WLAN) may be able to utilize discovery of a first type (e.g., TDLS or P2P) and then establish a connection of a different, second type (e.g., P2P or TDLS, respectively) without repeating the discovery process according to the second type. Thus, in some embodiments, a wireless communication link may be more quickly established than in conventional systems. Moreover, in some embodiments, a wireless communication link may be established with less signaling/overhead between the communication devices attempting to establish a link, as compared to conventional systems, which in turn may result in less traffic in the network that includes the communication devices, and/or less power consumption in the communication devices.

BRIEF DESCRIPTION OF THE DRAWINGS

Like reference symbols in the various drawings indicate like elements.

DETAILED DESCRIPTION

In embodiments described below, communication devices engage in a discovery process prior to establishing connectivity for data communications. In some embodiments, for example, Wi-Fi Display (WFD) devices engage in discovery prior to establishing connectivity in order to stream audio and/or video data. In an embodiment, a first device (referred to herein as a "discovering" device) sends a probe request signal and, in response, receives probe response signals from one or more second devices (referred to herein as "discovered" devices). If a device being discovered intends to use a different communication interface for link establishment than the communication interface on which the probe request frame was received, the device includes an address of the intended communication interface in the probe response frame, in an embodiment. In this manner, a communication device can perform discovery of a first type (e.g., TDLS or P2P) and achieve link establishment of a different, second type (e.g., P2P or TDLS, respectively), without necessarily performing an additional round of discovery, and without necessarily incurring the additional power consumption and time delay associated with the additional round of discovery.

Figure 1:
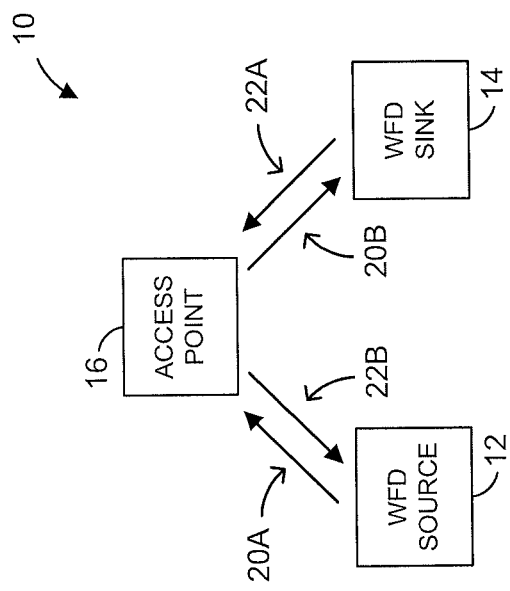
FIG. 1 is a block diagram illustrating an example tunneled discovery mechanism in a wireless local area network (WLAN), according to one scenario and embodiment.

FIG. 1 is a block diagram illustrating an example tunneled discovery mechanism in a wireless local area network (WLAN) 10, according to one scenario and embodiment. In the example embodiment and scenario of FIG. 1, the WLAN 10 includes a WFD source device 12, a WFD sink device 14, and an access point (AP) 16 with which both the WFD source device 12 and the WFD sink device 14 are associated. For example, in various embodiments, the WFD source device 12 is a WFD-capable mobile device such as a smartphone or laptop computer, and the WFD sink device 14 is a WFD-capable device such as a monitor or digital television able to play audio and/or video content provided by the WFD source device 12. The WFD devices 12, 14 and the AP 16 in FIG. 1 communicate according to an IEEE 802.11 protocol (e.g., IEEE 802.11a, 802.11b, 802.11n, etc.) in an infrastructure mode, in an embodiment. In an embodiment, the tunneled discovery mechanism of FIG. 1 operates according to Tunneled Direct Link Setup (TDLS), as defined in the IEEE 802.11z standard.

In one embodiment, the WFD source device 12 initiates tunneled discovery by sending a unicast or broadcast tunneled probe request frame 20A to other devices (e.g., other devices in the same basic service set (BSS) as WFD source device 12) via the AP 16, which acts as a relay for the probe request frame 20A. In the scenario of FIG. 1, the unicast or broadcast probe request frame 20B is received by the WFD sink device 14. After receiving the probe request frame 20B, in an embodiment, the WFD sink device 14 sends a probe response frame 22A to the AP 16. In an embodiment, the AP 16 then forwards the received probe response frame 22A to the WFD source device 12 as probe response frame 22B.

In an embodiment, both the probe request frame 20A sent from WFD source device 12 to AP 16, and the probe response frame 22A sent from WFD sink device 14 to AP 16, include a tunnel header that provides control information to the device receiving the respective frame. In an embodiment, the AP 16 is agnostic as to the contents of the discovery frames, and treats those frames as any other WLAN data packet.

Figure 2:
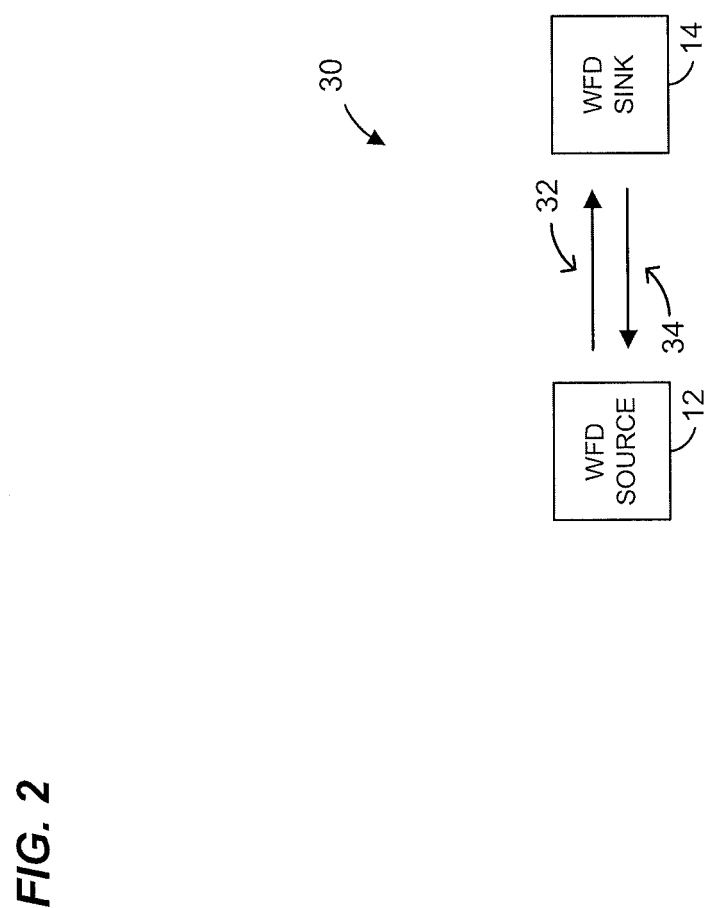
FIG. 2 is a block diagram of an example peer-to-peer discovery mechanism in a wireless network, according to one scenario and embodiment.

FIG. 2 is a block diagram of an example P2P discovery mechanism in a wireless network 30, according to one scenario and embodiment. Whereas the probe request frame 20A and probe response frame 22A pass through an AP (AP 16) in the example tunneled discovery mechanism of FIG. 1, the example P2P discovery mechanism of FIG. 2 involves a direct exchange of discovery frames. In one embodiment, the network 30 is the same as WLAN 10 of FIG. 1, but with FIG. 2 reflecting a different scenario in which the WFD devices 12, 14 engage in P2P discovery rather than tunneled discovery. The WFD devices 12, 14 communicate according to the Wi-Fi Alliance P2P specification, in an embodiment.

To initiate the P2P discovery process, the WFD source device 12 transmits (e.g., broadcasts) a probe request frame 32 that is received by the WFD sink device 14, after which the WFD sink device 14 transmits a probe response frame 34 directly to the WFD source device 12. The probe request frame 32 is similar to the probe request frame 20A of FIG. 1, and the probe response frame 34 is similar to the probe response frame 22A of FIG. 1, in an embodiment, except that neither of the discovery frames 32, 34 includes a tunnel header. In an embodiment, the P2P discovery mechanism of FIG. 1 operates according to the Wi-Fi Alliance P2P specification.

In an embodiment, the WFD devices 12, 14 of FIG. 1 or FIG. 2 are able, once discovery is complete, to establish a communication link either through an AP (e.g., AP 16 of FIG. 1) using TDLS, or directly using P2P. In some embodiments, the WFD devices 12, 14 are additionally capable of instead establishing, once discovery is complete, a TDLS link via another WFD device (not shown in FIG. 1) acting as a P2P group owner. In an embodiment, the WFD devices 12, 14 determine which type of connectivity will be used (e.g., TDLS versus P2P) based on the respective connectivity types preferred by the WFD devices 12, 14. In one embodiment, the WFD source device 12 indicates its preferred connectivity by including a preferred connectivity bit ("PC bit") in the probe request frame 20 of FIG. 1 or the probe request frame 32 of FIG. 2, and the WFD sink device 14 indicates its preferred connectivity by including a PC bit in the probe response frame 22 of FIG. 1 or the probe response frame 34 of FIG. 2. In one embodiment, the WFD devices 12, 14 resolve the connectivity scheme to be used for the upcoming session according to the current version of the WFD specification, as shown in the following table:

TABLE 1

| Case | Discovery mechanism | Connectivity preferred by discovering device | Connectivity preferred by discovered device | Resolved connectivity |
|---|---|---|---|---|
| 1 | P2P | P2P (PC bit = 0) | P2P (PC bit = 0) | P2P |
| 2 | P2P | TDLS (PC bit = 1) | TDLS (PC bit = 1) | TDLS |
| 3 | P2P | TDLS (PC bit = 1) | P2P (PC bit = 0) | P2P |
| 4 | P2P | P2P (PC bit = 0) | TDLS (PC bit = 1) | P2P |
| 5 | TDLS | P2P (PC bit = 0) | P2P (PC bit = 0) | P2P |
| 6 | TDLS | TDLS (PC bit = 1) | TDLS (PC bit = 1) | TDLS |
| 7 | TDLS | TDLS (PC bit = 1) | P2P (PC bit = 0) | P2P |
| 8 | TDLS | P2P (PC bit = 0) | TDLS (PC bit = 1) | P2P |

As seen in Table 1 above, in this embodiment, P2P is used to establish a communication link if at least one of the WFD devices 12, 14 prefers a P2P connection, while TDLS is used to establish the communication link only if both WFD devices 12, 14 prefer a TDLS connection. Notably, cases number 2, 5, 7 and 8 result in discovery of one type (P2P or TDLS) but link establishment of the other type (TDLS or P2P, respectively). Under the current WFD specification, this can lead to a problematic scenario in which the discovering device is unaware of the address of the communication interface that the discovered device intends to use to establish the communication link. This drawback of the prior art is discussed in further detail below with reference to FIG. 4.

While devices 12 and 14 are depicted as "WFD" devices in FIGS. 1 and 2, other embodiments instead include other, non-WFD devices that are capable of communicating in both tunneled and peer-to-peer modes. Moreover, in other embodiments, the devices 12, 14 are not a source/sink pair, and device 12 attempts to discover device 14 for other purposes such as exchanging control or other data.

Figure 3:
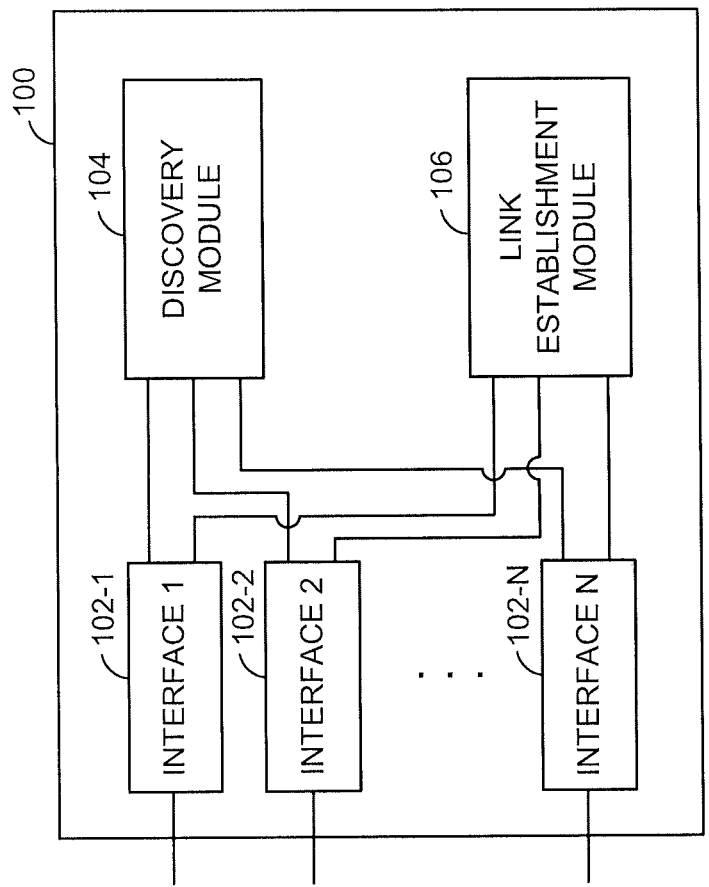
FIG. 3 is a block diagram of an example communication device configured to operate within the WLAN of FIG. 1 or the wireless network of FIG. 2, according to an embodiment.

FIG. 3 is a block diagram of an example communication device 100 configured to operate within the WLAN 10 of FIG. 1 and/or the wireless network 30 of FIG. 2, in various embodiments and/or scenarios. In one embodiment, both the WFD source device 12 and the WFD sink device 14 of FIGS. 1 and 2 are configured in the same manner as the communication device 100. In other embodiments, only the WFD source device 12, or only the WFD sink device 14, is configured in the same manner as the communication device 100.

The communication device 100 includes N communication interfaces 102-1 through 102-N. In various different embodiments, N is any integer greater than one. Each of the communication interfaces 102-1 through 102-N is configured to support wireless communications (e.g., transmission and reception of data packets) with other communication devices within a same wireless network as the communication device 100. In an embodiment, each of the communication interfaces 102-1 through 102-N can be designated and re-designated by the communication device 100 to transmit and receive signals according to different protocols and/or connection types. In one embodiment and scenario, for example, the communication device 100 designates communication interface 102-1 as a P2P interface to participate in P2P discovery and/or to establish P2P communication links with other devices, and designates communication interface 102-2 as a TDLS interface to participate in tunneled discovery and/or establish TDLS communication links with other devices. In some embodiments and scenarios, a single one of the communication interfaces 102-1 through 102-N can act as both a TDLS interface and a P2P interface. Moreover, in some embodiments and scenarios, two or more of the communication interfaces 102-1 through 102-N can act as TDLS interfaces, and/or two or more of the communication interfaces 102-1 through 102-N can act as P2P interfaces.

In one embodiment, each of the communication interfaces 102-1 through 102-N is associated with a different media access control (MAC) address. Moreover, in some embodiments, each of the communication interfaces 102-1 through 102-N includes a respective MAC processing unit (not shown in FIG. 3) that both generates MAC-layer data units to be transmitted and processes received MAC-layer data units. In various embodiments, each of the communication interfaces 102-1 through 102-N also includes a physical layer (PHY) processing unit (not shown in FIG. 3) for transmitting and receiving PHY data units, and/or one or more other, higher-layer processing units (also not shown in FIG. 3). In some embodiments, each of the communication interfaces 102-1 through 102-N includes, or is coupled to, a respective set of one or more antennas that is configured to transmit and receive PHY data units to and from other devices in the same wireless network. In other embodiments, two, more than two, or all of the communication interfaces 102-1 through 102-N share the same set of one or more antennas.

In some embodiments, the different communication interfaces 102-1 through 102-N are included in different hardware units (e.g., different network interface units, different integrated circuits, etc.). In other embodiments, two or more of the communication interfaces 102-1 through 102-N are associated with a single hardware unit. In one embodiment, for example, communication interfaces 102-1 and 102-2 are different logical units, with different MAC addresses, supported by a single network interface unit.

Figure 4:
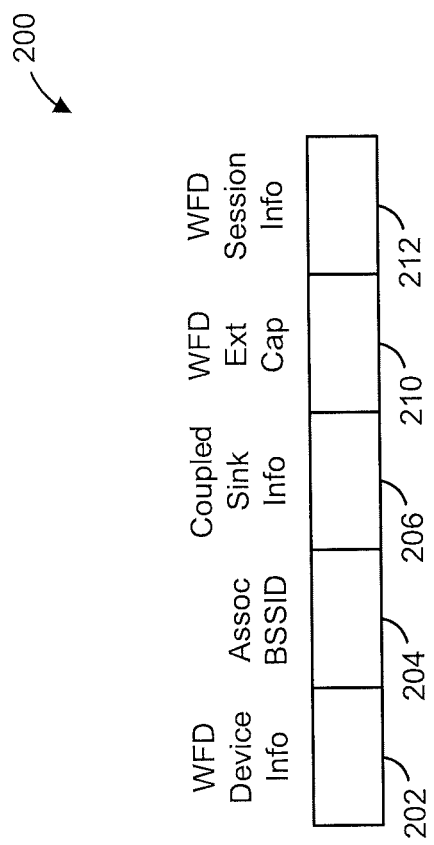
FIG. 4 is a diagram of a conventional WFD information element of a probe response frame.

The communication device 100 also includes a discovery module 104 configured to manage discovery operations involving the communication device 100, and a link establishment module 106 configured to manage link establishment operations once the discovery phase is complete. In an embodiment, both the discovery module 104 and the link establishment module 106 are coupled to each of the communication interfaces 102-1 through 102-N. While FIG. 4 shows a discovery module 104 and link establishment module 106 that are distinct from the communication interfaces 102-1 through 102-N, in some embodiments the discovery module 104 and/or link establishment module 106 are at least partially integrated within each of the communication interfaces 102-1 through 102-N. In one embodiment, for example, a first discovery module is included in communication interface 102-1, and performs the discovery management operations of discovery module 104 when communication interface 102-1 is used to send or receive discovery frames, while a second discovery module is included in communication interface 102-2, and performs the discovery management operations of discovery module 104 when communication interface 102-2 is used to send or receive discovery frames. As another example, in an embodiment, a first link establishment module is included in communication interface 102-1, and performs the link establishment operations of link establishment module 106 when a link is established via communication interface 102-1, while a second link establishment module is included in communication interface 102-2, and performs the link establishment operations of link establishment module 106 when a link is established via communication interface 102-2. In some embodiments, the discovery module 104 and link establishment module 106 also exchange information as needed. In one embodiment, for example, the discovery module 104 provides the link establishment module 106 with a preferred connectivity type indicated in a probe request frame being processed by the discovery module 104, so that the link establishment module 106 can resolve which connectivity type will be used.

In an embodiment, the discovery module 104 is implemented using a processor executing machine readable instructions stored in a memory. In an embodiment, the discovery module 104 is implemented using hardware circuitry. In an embodiment, link establishment module 106 is implemented using a processor executing machine readable instructions stored in a memory. In an embodiment, the link establishment module 106 is implemented using hardware circuitry.

The operation of communication device 100 is described in further detail below with reference to FIG. 5.

FIG. 4 is a diagram of a prior art WFD information element 200 of a probe response frame generated by a device being discovered, according to the current WFD specification. The WFD information element 200 includes a "WFD device information" subelement 202. The WFD device information subelement 202 indicates device capabilities, and includes a PC bit specifying the preferred connectivity of the discovered device (TDLS or P2P). The WFD information element 200 may also include one or more other of the subelements shown in FIG. 4. For example, the "associated BSSID" subelement 204 is included in the WFD information element 200 if the device transmitting the probe response frame is associated with an infrastructure AP or a P2P group owner, and if the device sets the PC bit to "1" in the WFD device information subelement 202. The "coupled sink information" subelement 206 is included in the WFD information element 200 if the device transmitting the probe response frame is a WFD sink device that supports coupled sink operation. The "WFD extended capability" subelement 210 is included in the WFD information element 200 if the device transmitting the probe response frame intends to advertise its TDLS persistent capability to other devices during discovery. The "WFD session information" subelement 212 is included in the WFD information element 200 if the device transmitting the probe response frame is a P2P group owner, and if the group owner has at least one associated client that is WFD-capable.

In the prior art approach, the discovering device can learn the MAC address of the interface that the discovered device used for the discovery process by identifying that MAC address in a source address field in a MAC header of the probe response frame. When a connectivity resolution scheme indicates a connectivity type that is different than the discovery type (e.g., cases 2, 5, 7 and 8 in the example scheme of Table 1), however, the prior art WFD information element 200 does not enable the discovering device to establish a link with the discovered device. In particular, the discovering device remains unaware, even after discovery, of the MAC address of the new interface that the other device will use to establish a communication link.

Figure 5:
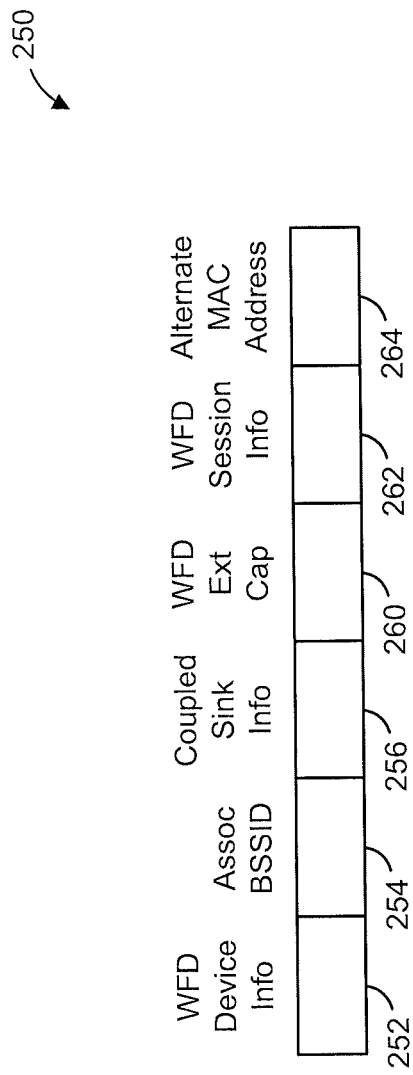
FIG. 5 is a diagram of an example WFD information element of a probe response frame, according to an embodiment.

FIG. 5 is a diagram of an example WFD information element 250 of a probe response frame, according to an embodiment, which addresses the shortcomings of the prior art described above. In an embodiment, the WFD information element 250 is included in the probe response signal 22A of FIG. 1 or the probe response signal 34 of FIG. 2, and/or is generated by the discovery module 104 of communication device 100 in FIG. 3. In various embodiments, the WFD information element 250 includes one or more of a "WFD device information" subelement 252, an "association BSSID" subelement 254, a "coupled sink information" subelement 256, a "WFD extended capability" subelement 260, and a "WFD session information" subelement 262, which in some embodiments are similar to the like-named subelements in the WFD information element 200 of FIG. 4. In other embodiments, the WFD information element 250 additionally or alternatively includes other fields not shown in FIG. 5.

In addition, in some embodiments and/or scenarios, the WFD information element 250 includes an "alternate MAC address" subelement 264. In one embodiment, the discovered device only includes the alternate MAC address subelement 264 in the WFD information element 250 of the probe response frame if the discovered device intends to use a communication interface for the upcoming connection scheme that is different than the communication interface used for discovery (e.g., as in cases 2, 5, 7 and 8 of Table 1 above). In an embodiment, the discovered device determines the intended communication interface by employing a connectivity resolution scheme or algorithm (e.g., accessing a table stored in memory, such as Table 1 above), and by determining which communication interface should be used for the resulting connectivity type.

Figure 6:
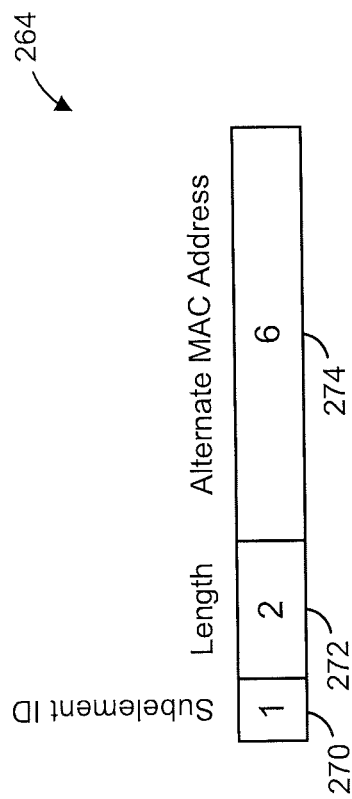
FIG. 6 is a diagram of an example alternate media access control (MAC) address subelement included in the WFD information element of FIG. 5, according to an embodiment.

FIG. 6 shows a detail of the alternate MAC address subelement 264 of the WFD information element 250, according to one embodiment. As seen in FIG. 6, the alternate MAC address subelement 264 includes, in this embodiment, a "subelement ID" field 270 with a single byte/octet having a value that identifies the subelement 264 as an alternate MAC address subelement, a "length" field 272 with two octets having a value of six to indicate the octet length of the "alternate MAC address" field 274, and the alternate MAC address field 274 itself. When the alternate MAC address subelement 264 is utilized, the alternate MAC address field 274 specifies an address of the communication interface that the discovered device intends to use to establish a connection link, in an embodiment. In one embodiment, for example, the alternate MAC address field 274 is a MAC address of a WLAN interface if TDLS connectivity (via an AP) is to be used, and is instead a MAC address of a P2P interface if P2P connectivity is to be used.

The contents of the alternate MAC address field 274 in FIG. 6 will now be described with respect to one embodiment and various example scenarios. In a first example scenario, the WFD sink device 14 is discovered by the WFD source device 12 during tunneled discovery as shown in FIG. 1, but P2P connectivity is used for the subsequent session between WFD source device 12 and WFD sink device 14. For this embodiment, the WFD sink device 14 is described with reference to the elements of communication device 100 in FIG. 3.

In this example scenario, the WFD sink device 14 receives the probe request frame 20B via the communication interface 102-1 (acting as a TDLS interface). In an embodiment, the discovery module 104 processes the probe request frame 20B to determine the preferred connectivity of WFD source device 12 (e.g., by determining the value of a PC bit in the probe request frame 20B, in an embodiment). The discovery module 104 also determines which type of connectivity is preferred by the WFD sink device 14, in an embodiment, and uses both preferred connectivity types to resolve which type of connectivity should ultimately be used for the session (e.g., according to Table 1 above, in an embodiment). Based on the connectivity type to be used, in an embodiment, the discovery module 104 also determines which of the communication interfaces 102-1 through 102-N will be used for the session. In a different embodiment, the connectivity type and/or the interface to be used for the session is/are instead determined by link establishment module 106, and/or other portions of WFD sink device 14, with the information then being passed to the discovery module 104.

In this first example scenario, the discovery module 104 (or other portion(s) of WFD sink device 14) determines that P2P connectivity will be used for the session (e.g., per case 5, 7 or 8 in Table 1 above), and that the link will be established via communication interface 102-2. In other embodiments and/or scenarios, it is instead determined that the link will be established via any other one of the communication interfaces 102-2 through 102-N. In an embodiment, the discovery module then generates the probe response frame 22A, which includes the WFD information element 250. In order to allow the WFD source device 12 to likewise determine the connectivity type to be used for the upcoming session, in an embodiment, the discovery module 104 sets the PC bit (in the WFD device information subelement 252 of WFD information element 250) to reflect the connectivity type preferred by the WFD sink device 14.

Further, the discovery module 104 sets the alternate MAC address field 274 to specify the address of the interface 102-2 that is to be used for link establishment. In some embodiments, the WFD source device 12 requires additional information regarding WFD sink device 14, beyond the address of its interface 102-2, before a P2P link may be established. In one embodiment where the P2P connection is to be established in accordance with the Wi-Fi Alliance P2P specification, for example, the WFD source device 12 (e.g., discovery module 104) uses a MAC address of the interface 102-2 (specified in the alternate MAC address field 274) as the "Device ID" attribute in a P2P information element of a probe request used to retrieve various P2P attributes of WFD sink device 14. The link establishment module 106 in WFD sink device 14 manages the portions of link establishment handled by WFD sink device 14, with a similar module in WFD source device 12 handling the portions of link establishment that are handled by WFD source device 12, in an embodiment.

In a second example scenario, the WFD sink device 14 is discovered by the WFD source device 12 during the P2P discovery process shown in FIG. 2, but TDLS connectivity is used for the subsequent link between WFD source device 12 and WFD sink device 14. As in the first example scenario, the WFD sink device 14 is described with reference to the elements of communication device 100 in FIG. 3 for this embodiment.

In this example scenario, the WFD sink device 14 receives the probe request frame 32 via the communication interface 102-1 (acting as a P2P interface). In an embodiment, the discovery module 104 processes the probe request frame 32 in part to determine the preferred connectivity of WFD source device 12 (e.g., by determining the value of a PC bit in the probe request frame 32, in an embodiment). The discovery module 104 also determines which type of connectivity is preferred by the WFD sink device 14, in an embodiment, and uses both preferred connectivity types to resolve which type of connectivity should ultimately be used for the session (e.g., according to Table 1 above, in an embodiment). Based on the connectivity type to be used for the upcoming session, in an embodiment, the discovery module 104 also determines which of the communication interfaces 102-1 through 102-N will be used for the session. In a different embodiment, the connectivity type and/or the interface to be used for the session is/are instead determined by link establishment module 106, and/or other portions of WFD sink device 14, with the information then being passed to the discovery module 104.

In this second example scenario, the discovery module 104 (or other portion of WFD sink device 14) determines that TDLS connectivity will be used for the session (e.g., per case 2 in Table 1 above), and that the link will be established via communication interface 102-2. In other embodiments and/or scenarios, it is instead determined that the link will be established via any other one of the communication interfaces 102-1 through 102-N. In an embodiment, the discovery module then generates the probe response frame 34, which includes the WFD information element 250. In order to allow the WFD source device 12 to likewise determine the connectivity type for the upcoming session, in an embodiment, the discovery module 104 sets the PC bit (in the WFD device information subelement 252 of WFD information element 250) to reflect the connectivity type preferred by the WFD sink device 14. Further, because the communication interface 102-2 to be used for the TDLS connection is different than (and has a different address than) the communication interface 102-1 that was used for P2P discovery, the discovery module 104 sets the alternate MAC address field 274 to specify the address of the communication interface 102-2 (e.g., a WLAN interface MAC address if tunneling is to be via an AP, or a P2P interface address associated with a P2P group owner if tunneling is to be via the P2P group owner). Thus, after receiving the probe response frame 34, the WFD source device 12 is able to correctly identify the interface (communication interface 102-2) of the WFD sink device 14, thereby allowing the TDLS link between WFD devices 12, 14 to be established (via an AP, or P2P group owner, with which both the WFD source device 12 and WFD sink device 14 are associated), in an embodiment. The link establishment module 106 in WFD sink device 14 manages the portions of link establishment handled by WFD sink device 14, with a similar module in WFD source device 12 handling the portions of link establishment handled by WFD source device 12, in an embodiment.

In other scenarios, the discovery type is the same as the link connectivity type (e.g., P2P for both, as in cases 1, 3 and 4 of Table 1, or TDLS for both, as in case 6 of Table 1), and so the WFD sink device 14 may retain the same one of the interfaces 102-1 through 102-N for both discovery and link establishment. In these scenarios, in some embodiments, the alternate MAC address subelement 264 is omitted, or simply unused (e.g., filled with "do not care" bits), because the WFD source device 12 can learn the address of the appropriate interface of WFD sink device 14 based on other information in the probe response frame (e.g., the source address field of a MAC header). In other embodiments, however, the WFD sink device 14 always includes the alternate MAC address subelement 264 in the WFD information element 250 of the probe response frame, or optionally can include the alternate MAC address subelement 264, even when the address is not needed for link establishment. In this manner, in an embodiment, the WFD sink device 14 can provide a unified view to the WFD source device 12. For example, under the Wi-Fi Alliance P2P specification, a device receiving a MAC address in the alternate MAC address subelement 264 can expose the "device name" of WFD sink device 14 to the user, and perform device name-to-MAC address mapping depending on the lower-layer connection type, in an embodiment.

Figure 7:
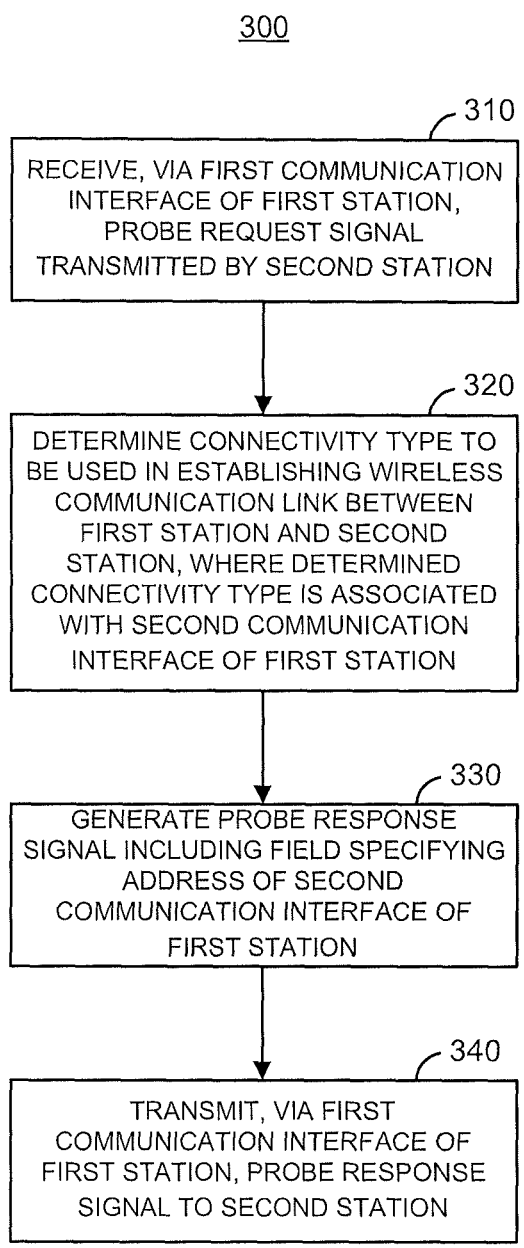
FIG. 7 is a flow diagram of an example method, implemented by a device being discovered, of facilitating an efficient transition from discovery to link establishment, according to an embodiment.

FIG. 7 is a flow diagram of an example method 300, implemented by a station/device being discovered, of facilitating an efficient transition from discovery to link establishment, according to an embodiment. At block 310, a first station implementing the method 300 (e.g., the communication device 100 of FIG. 3, in a scenario where the communication device 100 represents the WFD sink device 14 in network 10 of FIG. 1 or network 30 of FIG. 2, in an embodiment) receives a probe request signal transmitted by a second station (e.g., the WFD source device 12 in network 10 of FIG. 1 or network 30 of FIG. 2, in an embodiment). The probe request signal is received via a first communication interface of the first station. In one embodiment, the first communication interface is an interface similar to one of communication interfaces 102-1 through 102-N of communication device 100 in FIG. 3. In some embodiments, the probe request signal is a signal that was broadcast (e.g., by the second station, or by an AP after receiving the probe request signal from the second station).

In various embodiments and/or scenarios, the probe request signal is a TDLS probe request frame having a tunnel header (e.g., a probe request signal received via an AP with which both the first station and second station are associated), or a P2P probe request frame without a tunnel header. In an embodiment, the probe request signal specifies a preferred connectivity type of the second station (e.g., by including a field with a PC bit in a probe request frame).

At block 320, a connectivity type to be used in establishing a wireless communication link between the first station and the second station is determined. More specifically, the method 300 corresponds to a scenario in which the connectivity type is determined to be a connectivity type that is associated with a second communication interface of the first station, where the second communication interface is different than the first communication interface via which the probe request signal was received at block 310. In an embodiment, the connectivity type is determined at block 320 based on a preferred connectivity type of the second station (e.g., as specified in the probe request signal) and/or a preferred connectivity type of the first station. In one embodiment, for example, the connectivity type is determined according to Table 1, above.

At block 330, a probe response signal is generated. In various embodiments and/or scenarios, the probe response signal is a TDLS probe response frame having a tunnel header, or a P2P probe response frame without a tunnel header. The probe response signal includes a field (e.g., the alternate MAC address field 274 of FIG. 6, in an embodiment) specifying an address of the second communication interface of the first station. In an embodiment, the address of the second communication interface is useable by the second station to establish the wireless communication link between the first station and the second station. In an embodiment, the probe response signal also includes a field specifying a preferred connectivity type of the first station (e.g., by including a PC bit in a probe response frame).

In an embodiment, the probe response signal is generated at block 330 in response to determining the connectivity type at block 320. For example, in one embodiment, the probe response signal is generated at block 330 in response to determining that the connectivity type to be used for the upcoming session (e.g., P2P or TDLS) will be different than the discovery type (e.g., TDLS or P2P). As another example, in an embodiment, the probe response signal is generated at block 330 in response to determining that the connectivity type to be used for the upcoming session will involve the use of a communication interface, of the first station, that is different than the communication interface used by the first station during discovery.

At block 340, the probe response signal generated at block 330 is transmitted, via the first communication interface of the first station, to the second station. In one embodiment and scenario where the method 300 represents a tunneled discovery process, the probe response signal is transmitted to the second station by way of an AP with which both the first station and second station are associated.

In an embodiment, the method 300 also includes, after block 340, and after the link has been established between the first station and second station, communicating with the second station, via the second communication interface, according to the connectivity type determined at block 320.

In some embodiments and scenarios, the method 300 is used to provide an efficient transition from tunneled discovery to establishment of a P2P communication link. In some of these embodiments/scenarios, the probe request signal received at block 310 is a TDLS probe request frame (e.g., a tunneled probe request frame received via an AP with which both the first station and the second station are associated), the connectivity type determined at block 320 is P2P connectivity, and the probe response signal generated at block 330, and transmitted at block 340, is a TDLS probe response frame (e.g., a tunneled probe response frame transmitted via an AP with which both the first station and the second station are associated). Moreover, in one such embodiment/scenario, the first communication interface is a WLAN interface configured to support TDLS communications, the second communication interface is a P2P interface configured to support P2P communications, and the address specified in the probe response signal generated at block 330 is a MAC address of the second, P2P interface.

In other embodiments and/or scenarios, the method 300 is used to provide an efficient transition from P2P discovery to establishment of a TDLS communication link. In some of these embodiments/scenarios, the probe request signal received at block 310 is a P2P probe request frame (e.g., broadcast by the second station), the connectivity type determined at block 320 is TDLS connectivity, and the probe response signal generated at block 330, and transmitted at block 340, is a P2P probe response frame. Moreover, in one such embodiment/scenario, the first communication interface is a P2P interface configured to support P2P communications, the second communication interface is a WLAN interface configured to support TDLS communications, and the address specified in the probe response signal generated at block 330 is a MAC address of the second, WLAN interface. Alternatively, in one embodiment/scenario, the first communication interface is a first P2P interface, the second communication interface is a second P2P interface that is associated to a P2P group owner, and the address specified in the probe response signal generated at block 330 is a MAC address of the second P2P interface.

Figure 8:
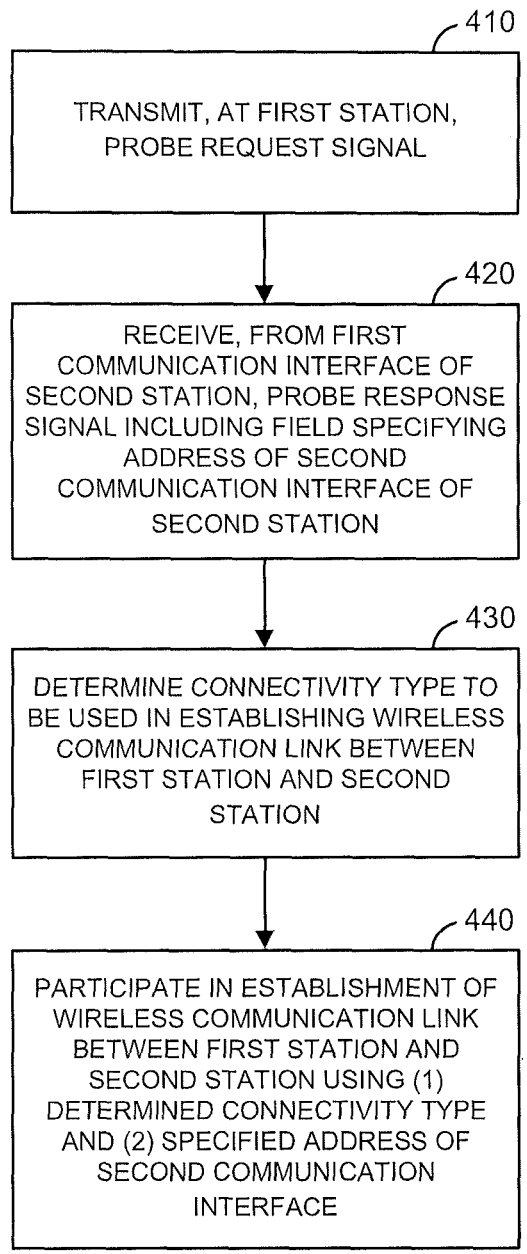
FIG. 8 is a flow diagram of an example method, implemented by a device initiating discovery, of facilitating an efficient transition from discovery to link establishment, according to an embodiment.

FIG. 8 is a flow diagram of another example method 400 of facilitating an efficient transition from discovery to link establishment, according to an embodiment. Unlike the method 300 of FIG. 7, however, the method 400 is implemented by a station/device that initiates the discovery process, in an embodiment. At block 410, a first station implementing the method 400 (e.g., the communication device 100 of FIG. 3, in a scenario where the communication device 100 represents the WFD source device 12 in network 10 of FIG. 1 or network 30 of FIG. 2, in an embodiment) transmits a probe request signal. In some embodiments, the probe request signal is broadcast by the first station, or by an AP after receiving the probe request signal from the first station. In one embodiment, the probe request signal includes a field specifying a preferred connectivity type of the first station (e.g., by including a PC bit in a probe request frame).

At block 420, a probe response signal is received, in response to the probe request signal transmitted at block 410, from a first communication interface of a second station (e.g., the WFD sink device 14 in network 10 of FIG. 1 or network 30 of FIG. 2, in an embodiment). In an embodiment, the probe response signal is received from a communication interface of the second station that is similar to one of communication interfaces 102-1 through 102-N of communication device 100 in FIG. 3.

The probe response signal includes a field (e.g., the alternate MAC address field 274 of FIG. 6, in an embodiment) specifying an address of a second communication interface of the second station, with the second communication interface being different than the first communication interface from which the probe response signal is received at block 420. In an embodiment, the second communication interface is another one of communication interfaces 102-1 through 102-N. In one embodiment, the probe response signal also includes a field specifying a preferred connectivity type of the second station (e.g., by including a PC bit in a probe response frame).

At block 430, a connectivity type to be used in establishing a wireless communication link between the first station and the second station is determined (e.g., according to Table 1, in an embodiment). The determined connectivity type is a connectivity type that is associated with the second communication interface (i.e., the interface for which an address is specified in the probe response signal received at block 420). Thus, the first station makes the same connectivity type determination that the second station made before generating the probe response signal, in an embodiment. In an embodiment, the connectivity type is determined at block 430 based on a preferred connectivity type of the second station (e.g., as specified in the probe response signal) and/or a preferred connectivity type of the first station. In one embodiment, for example, the connectivity type is determined according to Table 1, above.

At block 440, the first station implementing the method 400 participates in the establishment of the wireless communication link between the first station and the second station, using the connectivity type determined at block 430, and using the address of the second communication interface specified in the probe response signal received at block 420. As link establishment may require, in some embodiments, actions at both the first station and the second station, the participation at block 440 includes only those portions/tasks of link establishment that are performed by the first station performing the method 400.

In some embodiments and scenarios, the method 400 is used to provide an efficient transition from tunneled discovery to establishment of a P2P communication link. In these embodiments/scenarios, the probe request signal transmitted at block 410 is a TDLS probe request frame (e.g., a tunneled probe request frame transmitted via an AP with which both the first station and the second station are associated), the probe response signal received at block 420 is a TDLS probe response frame (e.g., a tunneled probe response frame received via an AP with which both the first station and the second station are associated), and the connectivity type determined at block 430 is P2P connectivity. Moreover, in one such embodiment/scenario, the first communication interface is a WLAN interface configured to support TDLS communications, the second communication interface is a P2P interface configured to support P2P communications, and the address specified in the probe response signal received at block 420 is a MAC address of the second, P2P interface.

In other embodiments and/or other scenarios, the method 400 is used to provide an efficient transition from P2P discovery to establishment of a TDLS communication link. In these embodiments/scenarios, the probe request signal transmitted at block 410 is a P2P probe request frame (e.g., a probe request frame broadcast by the first station), the probe response signal received at block 420 is a P2P probe response frame, and the connectivity type determined at block 430 is TDLS connectivity. Moreover, in one such embodiment/scenario, the first communication interface is a P2P interface configured to support P2P communications, the second communication interface is a WLAN interface configured to support TDLS communications, and the address specified in the probe response signal received at block 420 is a MAC address of the second, WLAN interface.

Figure 9A:
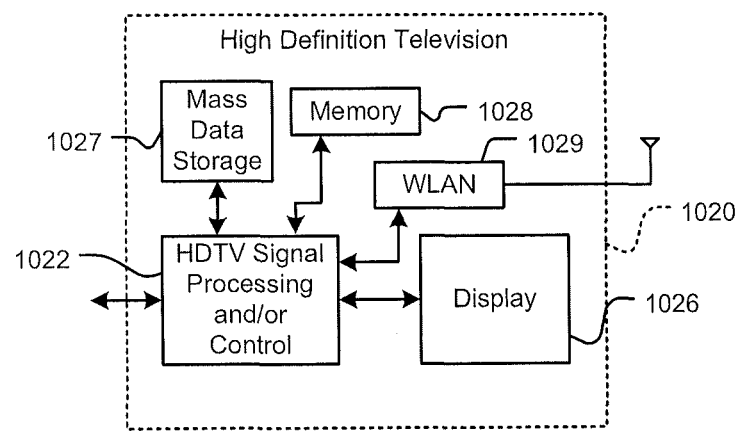
FIG. 9A is a block diagram of an example high definition television that facilitates the transition from discovery to link establishment according to techniques described herein, according to an embodiment.
Figure 9B:
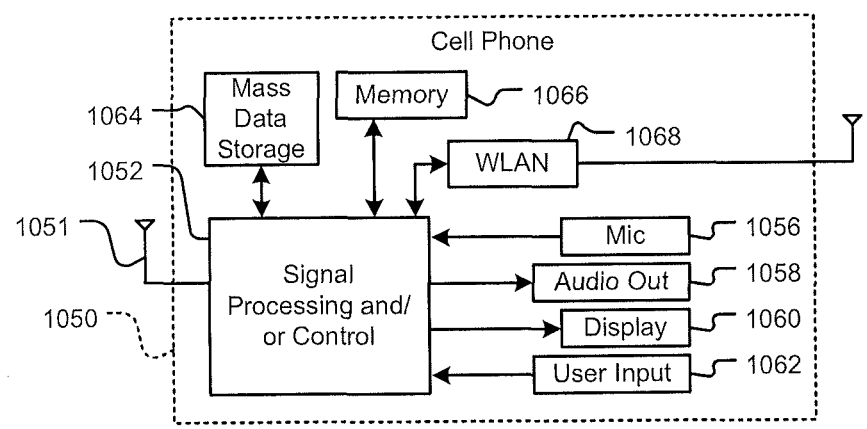
FIG. 9B is a block diagram of a mobile phone that facilitates the transition from discovery to link establishment according to techniques described herein, according to an embodiment.
Figure 9C:
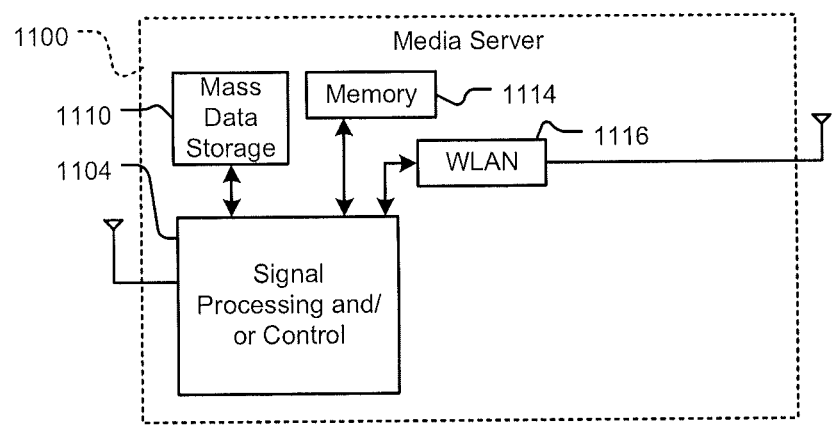
FIG. 9C is a media server that facilitates the transition from discovery to link establishment according to techniques described herein, according to an embodiment.

Techniques for facilitating the transition from discovery to link establishment such as those described above may be utilized in various WFD or non-WFD devices. FIGS. 9A-9C illustrate various devices in which techniques for facilitating the transition from discovery to link establishment, such as those described above, are employed in different embodiments.

Referring first to FIG. 9A, such techniques may be utilized in a high definition television (HDTV) 1020. In one embodiment, the HDTV 1020 is the WFD sink device 14 of FIG. 1 or FIG. 2. HDTV 1020 includes a mass data storage 1027, an HDTV signal processing and control block 1022, a WLAN interface and memory 1028. HDTV 1020 receives HDTV input signals in either a wired or wireless format and generates HDTV output signals for a display 1026. In some implementations, signal processing circuit and/or control circuit 1022 and/or other circuits (not shown) of HDTV 1020 may process data, perform coding and/or encryption, perform calculations, format data and/or perform any other type of HDTV processing that may be required.

HDTV 1020 may communicate with a mass data storage 1027 that stores data in a nonvolatile manner such as optical and/or magnetic storage devices. The mass storage device may be a mini HDD that includes one or more platters having a diameter that is smaller than approximately 1.8". HDTV 1020 may be connected to memory 1028 such as RAM, ROM, low latency nonvolatile memory such as flash memory and/or other suitable electronic data storage. HDTV 1020 also may support connections with a WLAN via a WLAN network interface 1029. The WLAN network interface 1029 (alone, or in concert with the signal processing and/or control circuit 1022) may implement techniques for facilitating the transition from discovery to link establishment such as those described above (e.g., some or all of the functions of discovery module 104 and link establishment module 106 in FIG. 3, or method 300 in FIG. 7), and include one or more interfaces such as communication interfaces 102-1 through 102-N of FIG. 3.

Referring now to FIG. 9B, techniques for facilitating the transition from discovery to link establishment such as those described above may be used in a mobile phone 1050 that may include an antenna 1051. In one embodiment, the mobile phone 1050 is the WFD source device 12 of FIG. 1 or FIG. 2. The mobile phone 1050 may include either or both signal processing and/or control circuits, which are generally identified in FIG. 9B at 1052, a WLAN network interface 1068 and/or mass data storage 1064 of the mobile phone 1050. In some implementations, mobile phone 1050 includes a microphone 1056, an audio output 1058 such as a speaker and/or audio output jack, a display 1060 and/or an input device 1062 such as a keypad, pointing device, voice actuation and/or other input device. Signal processing and/or control circuits 1052 and/or other circuits (not shown) in mobile phone 1050 may process data, perform coding and/or encryption, perform calculations, format data and/or perform other mobile phone functions.

Mobile phone 1050 may communicate with mass data storage 1064 that stores data in a nonvolatile manner such as optical and/or magnetic storage devices for example hard disk drives HDD and/or DVDs. The HDD may be a mini HDD that includes one or more platters having a diameter that is smaller than approximately 1.8". Mobile phone 1050 may be connected to memory 1066 such as RAM, ROM, low latency nonvolatile memory such as flash memory and/or other suitable electronic data storage. Mobile phone 1050 also may support connections with a WLAN via a WLAN network interface 1068. The WLAN network interface 1068 (alone, or in concert with the signal processing and/or control circuit 1052) may implement techniques for facilitating the transition from discovery to link establishment such as those described above (e.g., some or all of the functions of method 400 in FIG. 8).

Referring now to FIG. 9C, techniques for facilitating the transition from discovery to link establishment such as those described above may be used in a media server 1100. In one embodiment, the media server 1100 is the WFD source device 12 of FIG. 1 or FIG. 2. The media server 1100 may include either or both signal processing and/or control circuits, which are generally identified in FIG. 9C at 1104, a WLAN interface and/or mass data storage 1110 of the media server 1100. Signal processing and/or control circuits 1104 and/or other circuits (not shown) of media server 1100 may process data, perform coding and/or encryption, perform calculations, format data and/or perform any other media server function.

Media server 1100 may communicate with mass data storage 1110 that stores data such as compressed audio and/or video content in a nonvolatile manner and may utilize jitter measurement. In some implementations, the compressed audio files include files that are compliant with MP3 format or other suitable compressed audio and/or video formats. The mass data storage may include optical and/or magnetic storage devices for example hard disk drives HDD and/or DVDs. The HDD may be a mini HDD that includes one or more platters having a diameter that is smaller than approximately 1.8". Media server 1100 may be connected to memory 1114 such as RAM, ROM, low latency nonvolatile memory such as flash memory and/or other suitable electronic data storage. Media server 1100 also may support connections with a WLAN via a WLAN network interface 1116. The WLAN network interface 1116 (alone, or in concert with the signal processing and/or control circuit 1104) may implement techniques for facilitating the transition from discovery to link establishment such as those described above (e.g., some or all of the functions of discovery module 104 and link establishment module 106 in FIG. 3, or method 300 in FIG. 7), and include one or more interfaces such as communication interfaces 102-1 through 102-N of FIG. 3.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. Likewise, the software or firmware instructions may be delivered to a user or a system via any known or desired delivery method including, for example, on a computer readable disk or other transportable computer storage mechanism or via communication media. Communication media typically embodies computer readable instructions, data structures, program modules or other data in a modulated data signal such as a carrier wave or other transport mechanism. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared and other wireless media. Thus, the software or firmware instructions may be delivered to a user or a system via a communication channel such as a telephone line, a DSL line, a cable television line, a fiber optics line, a wireless communication channel, the Internet, etc. (which are viewed as being the same as or interchangeable with providing such software via a transportable storage medium). The software or firmware instructions may include machine readable instructions that, when executed by the processor, cause the processor to perform various acts.

When implemented in hardware, the hardware may comprise one or more of discrete components, an integrated circuit, an application-specific integrated circuit (ASIC), etc.

While the present invention has been described with reference to specific examples, which are intended to be illustrative only and not to be limiting of the invention, changes, additions and/or deletions may be made to the disclosed embodiments without departing from the scope of the claims.

What is claimed is:

1. A method, comprising:
   receiving, via a first communication interface of a first station, a probe request signal transmitted by a second station;
   determining, at the first station, a connectivity type to be used in establishing a wireless communication link between the first station and the second station;
   generating, at the first station, a probe response signal, wherein generating the probe response signal includes
   (i) generating a first field within the probe response signal, wherein
   the first field specifies an address of the first communication interface of the first station, and the first field is located in a media access control (MAC) header of the probe response signal,
   (ii) in response to determining that the connectivity type to be used in establishing the wireless communication link is associated with a second communication interface of the first station that is different than the first communication interface of the first station, generating a second field within the probe response signal, wherein
   the second field specifies an address of a second communication interface of the first station, and the second field is located in a payload of the probe response signal, and
   (iii) in response to determining that the connectivity type to be used in establishing the wireless communication link is associated with the first communication interface of the first station, generating the probe response signal such that the address of a second communication interface is not included in the probe response signal; and
   transmitting, via the first communication interface of the first station, the probe response signal to the second station,
   wherein the address of the second communication interface specified in the second field of the probe response signal is useable by the second station to establish the wireless communication link between the first station and the second station.

2. The method of claim 1, further comprising:
   after the wireless communication link is established, communicating with the second station (i) according to the determined connectivity type and (ii) via one of the first communication interface or the second communication interface that is associated with the determined connectivity type.

3. The method of claim 1, wherein:
   the probe request signal specifies a preferred connectivity type of the second station; and
   generating the probe response signal further includes generating a third field within the probe response signal, wherein the third field specifies a preferred connectivity type of the first station.

4. The method of claim 3, wherein determining the connectivity type includes:
   determining the connectivity type based on at least one of (i) the preferred connectivity type of the second station and (ii) the preferred connectivity type of the first station.

5. The method of claim 1, wherein:
   receiving the probe request signal includes receiving a Tunneled Direct Link Setup (TDLS) probe request frame;
   the determined connectivity type is Peer-to-Peer (P2P) connectivity;
   generating the probe response signal includes generating a TDLS probe response frame; and
   transmitting the probe response signal includes transmitting the TDLS probe response frame.

6. The method of claim 5, wherein:
   the first communication interface is a wireless local area network (WLAN) interface;
   the second communication interface is a P2P interface; and
   the address of the second communication interface is a media access control (MAC) address of the P2P interface.

7. The method of claim 6, wherein:
   receiving the TDLS probe request frame includes receiving the TDLS probe request frame via an access point with which both the second station and the first station are associated; and
   transmitting the TDLS probe response frame includes transmitting the TDLS probe response frame to the second station via the access point.

8. The method of claim 1, wherein:
   receiving the probe request signal includes receiving a Peer-to-Peer (P2P) probe request frame;
   the determined connectivity type is Tunneled Direct Link Setup (TDLS) connectivity;
   generating the probe response signal includes generating a P2P probe response frame; and
   transmitting the probe response signal includes transmitting the P2P probe response frame.

9. The method of claim 8, wherein:
   the first communication interface is a P2P interface;
   the second communication interface is a wireless local area network (WLAN) interface; and
   the address of the second communication interface is a media access control (MAC) address of the WLAN interface.

10. The method of claim 8, wherein:
    the first communication interface is a first P2P interface;
    the second communication interface is a second P2P interface, wherein the second P2P interface is associated to a group owner; and
    the address of the second communication interface is a media access control (MAC) address of the second P2P interface.

11. A communication device, comprising:
    a first communication interface;
    a second communication interface;
    a link establishment module configured to determine a connectivity type to be used in establishing a wireless communication link between the communication device and a station; and
    a discovery module configured to
    receive a probe request signal from the station via the first communication interface,
    generate a probe response signal, wherein generating the probe response signal includes
    (i) generating a first field within the probe response signal, wherein the first field specifies an address of the first communication interface, and the first field is located in a media access control (MAC) header of the probe response signal,
    (ii) in response to determining that the connectivity type to be used in establishing the wireless communication link is associated with a second communication interface of the first station that is different than the first communication interface of the first station, generating a second field within the probe response signal, wherein the second field specifies an address of a second communication interface of the first station, and the second field is located in a payload of the probe response signal, and (iii) in response to determining that the connectivity type to be used in establishing the wireless communication link is associated with the first communication interface of the first station, generating the probe response signal such that the address of a second communication interface is not included in the probe response signal, and cause the probe response signal to be transmitted to the station via the first communication interface, wherein the address of the second communication interface specified in the second field of the probe response signal is useable by the station to establish the wireless communication link between the communication device and the station.

12. The communication device of claim 11, wherein the link establishment module is configured to determine the connectivity type based at least in part on (i) a preferred connectivity type of the station specified in the probe request signal and (ii) a preferred connectivity type of the communication device.

13. The communication device of claim 11, wherein:
the probe request signal is a Tunneled Direct Link Setup (TDLS) probe request frame;
the determined connectivity type is Peer-to-Peer (P2P) connectivity; and
the probe response signal is a TDLS probe response frame.

14. The communication device of claim 11, wherein:
the probe request signal is a Peer-to-Peer (P2P) probe request frame;
the determined connectivity type is Tunneled Direct Link Setup (TDLS) connectivity; and
the probe response signal is a P2P probe response frame.

15. A method comprising:
transmitting, at a first station, a probe request signal;
receiving, at the first station and from a first communication interface of a second station, a probe response signal in response to the probe request signal, wherein the probe response signal includes
a first field specifying an address of the first communication interface of the second station, wherein the first field is located in a media access control (MAC) header of the probe response signal, and
if the second station determined that a connectivity type to be used in establishing a wireless communication link with the first station is associated with a second communication interface of the first station, a second field specifying an address of the second communication interface of the second station, wherein
the second field is located in a payload of the probe response signal,
the second communication interface is different than the first communication interface, and
if the second station determined that the connectivity type to be used in establishing the wireless communication link with the first station is associated with the first communication interface of the first station, the address of the second communication interface of the second station is not included in the probe response signal;

determining, at the first station, the connectivity type to be used in establishing the wireless communication link between the first station and the second station; and participating, at the first station, in establishment of the wireless communication link between the first station and the second station using (i) the determined connectivity type and (ii) a communication interface of the first station associated with the determined connectivity type.

16. The method of claim 15, wherein:
the probe request signal includes a field specifying a preferred connectivity type of the first station;
the probe response signal further includes a third field specifying a preferred connectivity type of the second station; and
determining the connectivity type includes determining the connectivity type based on at least one of (i) the preferred connectivity type of the first station and (ii) the preferred connectivity type of the second station.

17. The method of claim 15, wherein transmitting the probe request signal includes broadcasting the probe request signal.

18. The method of claim 15, wherein:
transmitting the probe request signal includes transmitting a Tunneled Direct Link Setup (TDLS) probe request frame;
the determined connectivity type is Peer-to-Peer (P2P) connectivity;
receiving the probe response signal includes receiving a TDLS probe response frame;
the first communication interface is a wireless local area network (WLAN) interface;
the second communication interface is a P2P interface; and
the address of the second communication interface is a media access control (MAC) address of the P2P interface.

19. The method of claim 18, wherein:
transmitting the TDLS probe request frame includes transmitting the TDLS probe request frame to the first communication interface of the second station via an access point with which both the first station and the second station are associated; and
receiving the TDLS probe response frame includes receiving the TDLS probe response frame from the first communication interface of the second station via the access point.

20. The method of claim 15, wherein:
transmitting the probe request signal includes transmitting a Peer-to-Peer (P2P) probe request frame;
the determined connectivity type is Tunneled Direct Link Setup (TDLS) connectivity;
receiving the probe response signal includes receiving a P2P probe response frame;
the first communication interface is a P2P interface;
the second communication interface is a wireless local area network (WLAN) interface; and
the address of the second communication interface is a media access control (MAC) address of the WLAN interface.

21. A communication device comprising:
a discovery module configured to
cause a probe request signal to be transmitted, and
receive, in response to the probe request signal, a probe response signal from a first communication interface of a station, wherein the probe response signal includes a first field specifying an address of the first communication interface of the second station, wherein the first field is located in a media access control (MAC) header of the probe response signal, and if the second station determined that a connectivity type to be used in establishing a wireless communication link with the first station is associated with a second communication interface of the first station, a second field specifying an address of the second communication interface of the second station, wherein the second field is located in a payload of the probe response signal, the second communication interface is different than the first communication interface, if the second station determined that the connectivity type to be used in establishing the wireless communication link with the first station is associated with the first communication interface of the first station, the address of the second communication interface of the second station is not included in the probe response signal; and a link establishment module configured to determine a connectivity type to be used in establishing a wireless communication link between the communication device and the station, and participate in establishment of the wireless communication link between the communication device and the station (i) according to the determined connectivity type and (ii) via a communication interface of the station associated with the determined connectivity type.

22. The communication device of claim 21, wherein:

the link establishment module is configured to determine the connectivity type based on at least one of (i) a preferred connectivity type of the communication device and (ii) a preferred connectivity type of the station;

the preferred connectivity type of the communication device is specified in the probe request signal; and the preferred connectivity type of the station is specified in the probe response signal.

23. The communication device of claim 21, wherein:

the probe request signal is a Tunneled Direct Link Setup (TDLS) probe request frame;

the determined connectivity type is Peer-to-Peer (P2P) connectivity; and the probe response signal is a TDLS probe response frame.

24. The communication device of claim 21, wherein:

the probe request signal is a Peer-to-Peer (P2P) probe request frame;

the determined connectivity type is Tunneled Direct Link Setup (TDLS) connectivity; and the probe response signal is a P2P probe response frame.

* * * * *